United States Patent

Coloumbe

(10) Patent No.: US 7,377,329 B2
(45) Date of Patent: May 27, 2008

(54) TRACTION DEVICE FOR THE HOOF OF A HORSE

(76) Inventor: Robert W. Coloumbe, 577 Industrial Dr., Fort Erie, Ontario (CA)

( * ) Notice: Subject to any disclaimer, the term of this patent is extended or adjusted under 35 U.S.C. 154(b) by 0 days.

(21) Appl. No.: 11/361,784

(22) Filed: Feb. 24, 2006

(65) Prior Publication Data

US 2007/0062711 A1    Mar. 22, 2007

Related U.S. Application Data

(60) Provisional application No. 60/656,830, filed on Sep. 19, 2005.

(51) Int. Cl.
*A01L 1/02*    (2006.01)
(52) U.S. Cl. ............................ 168/4; 168/24
(58) Field of Classification Search .................... 168/4, 168/24, 5, 30, 39–43
See application file for complete search history.

(56) References Cited

U.S. PATENT DOCUMENTS

| | | | | |
|---|---|---|---|---|
| 821,414 A | * | 5/1906 | Hennebeul ................ 168/31 |
| 876,265 A | * | 1/1908 | Campbell ................ 168/4 |
| 894,942 A | * | 8/1908 | Drown et al. ............. 168/24 |
| 1,130,834 A | * | 3/1915 | Nolan ................ 168/4 |
| 1,200,037 A | * | 10/1916 | Simek ................ 168/31 |
| 1,397,046 A | * | 11/1921 | Haller ................ 168/24 |
| 1,629,083 A | * | 5/1927 | Meade ................ 168/24 |
| 1,761,241 A | * | 6/1930 | Smithson ............... 168/21 |
| 516,046 A | * | 3/1984 | Birdsall ............... 168/24 |
| 4,690,222 A | * | 9/1987 | Cameron ............... 168/4 |
| 5,002,133 A | * | 3/1991 | Rybak ................ 168/4 |

FOREIGN PATENT DOCUMENTS

FR    2858520 A1    *    2/2005
WO    WO 03041497 A1    *    5/2003

* cited by examiner

*Primary Examiner*—Son T. Nguyen
(74) *Attorney, Agent, or Firm*—The Weintraub Group, PLC

(57) ABSTRACT

A horseshoe adapted to be attached to the hoof of a horse comprises a body having a U-shaped configuration, the body including a ground engaging surface, a hoof engaging surface, and a convex outer and a concave inner side wall, the side walls extending between the surfaces, and a continuous sequence of separate wedges in the form of V-shaped projections for improving traction of the horseshoe are integrally formed and extend outwardly from the convex outer side wall. An open sided swedge is provided in the ground engaging surface of the body.

12 Claims, 1 Drawing Sheet

TRACTION DEVICE FOR THE HOOF OF A HORSE

CROSS-REFERENCE TO RELATED APPLICATIONS

This application is a continuation in part of co-pending provisional Patent Application Ser. No. 60/656,830, filed Sep. 19, 2005, the disclosure of which is hereby incorporated by reference in its entirety.

BACKGROUND OF THE INVENTION

1. Field of the Invention

This invention relates to the art and science of horseshoeing, and more particularly, to a tooth system that integrally formed on and is a part of a performance horseshoe to provide improved traction to the horse when running.

2. Description of the Prior Art

Horseshoes come in a variety of sizes and shapes depending on the type of horse and activity for which the horse is to be engaged. Generally horseshoes are U-shaped and conform to the circumference of the hoof with two branches emanating from the toe area and projecting beyond the heel. Typically, the horseshoe is nailed to the hoof.

A suitable gripping device which improves the grip between the horse's hoof and the contacting surface and spreads shock over the hoof is disclosed in U.S. Pat. No. 5,636,695, issued Jun. 10, 1997 to Watson, Jr., et al, the specification of which is specifically incorporated herein by reference.

While the Watson gripping device is suitable, it has been found that a desirable horseshoe would also provide side traction to enable the horse to travel straighter, and keep its leg under itself when running around bends, barrels and the like.

Accordingly, an object of this invention is the provision of an improved horseshoe which prolongs wear of the shoe in the toe area, introduces quicker groundbreaking resulting in a faster gate, and provides side traction allowing the horse to travel straighter keeping its leg under itself when running around bends, barrels etc. when the horse is involved in racing and other competitive activities.

SUMMARY OF THE INVENTION

According to this invention, there is provided a horseshoe adapted to be fitted to the hoof of a horse, the horseshoe comprising a body having a U-shaped configuration, said body including a ground engaging surface, a hoof engaging surface, and a convex outer and a concave inner side wall, said side walls extending between said surfaces, and means for improving traction of the horseshoe, said means being integrally formed and extending outwardly from and around the convex outer side wall.

The means for improving traction comprises a continuous sequence of separate triangle shaped projections, the base and apex of the triangle shape projections, respectively, being proximate to the hoof and ground engaging surfaces. Preferably, the projections comprise a plurality of V-shaped wedges, which are in side-by-side relation and extend downwardly from the hoof engaging surface, each wedge including a triangular shaped surface and a pair of triangular shaped sides which cooperate to form a V-shaped ground engaging end adjacent to the ground engaging surface.

Preferably, the triangular shaped surfaces are in a plane that is generally perpendicular to the hoof engaging surface and at an acute angle to the convex outer sidewall.

Preferably, the convex sidewall is at an acute angle of about from between 15° and 22° to a perpendicular extending from the ground engaging surface and the sidewalls combine to form a V-shape end having an acute angle "C" of about 55° to 65°.

Further and according to this invention, the horseshoe comprises an open sided swedge in the ground engaging surface of the body. The swedge is defined in part by a substantially planar topside disposed between said outer and inner side walls, each of said side walls being substantially perpendicular to the topside at portions proximal thereto.

Although many suitable methods for forming the horseshoe are contemplated, such as by extruding, the body of the horseshoe is comprised of a material selected from the group consisting of steel, aluminum, aluminum alloys, and plastic.

The ground and hoof sections and the sidewalls jointly define an arcuate toe section, the open sided swedge extends completely through the ground section, and a wear member, such as a toe calk, is adapted to be received in the swedge portion of the arcuate toe section.

For a more complete understanding of the present invention, reference is made to the following detailed description and accompanying drawings. In the drawings, like reference characters refer to like parts throughout the several views, in which:

DETAILED DESCRIPTION OF A PREFERRED EMBODIMENT OF THE INVENTION

Figure 3:
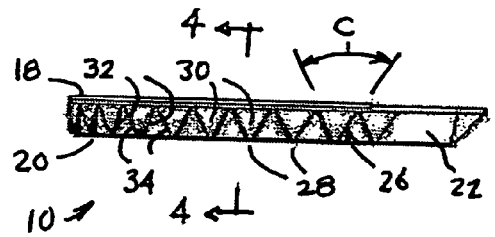
FIG. 3 is a side elevation view of the horseshoe shown in FIG. 1 and ground engaging traction wedges disposed therearound.
Figure 1:
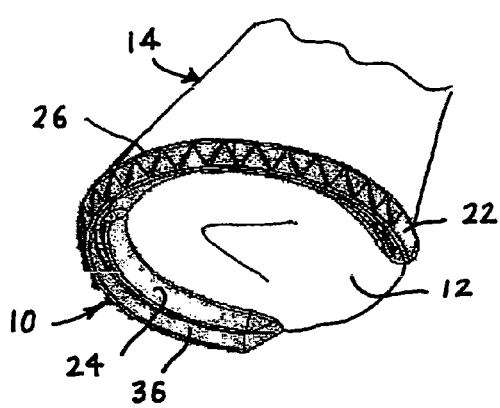
FIG. 1 is a perspective view looking upwardly at a horseshoe, according to this invention, attached to the hoof of a horse, and the ground engaging surface of the horseshoe.
Figure 4:
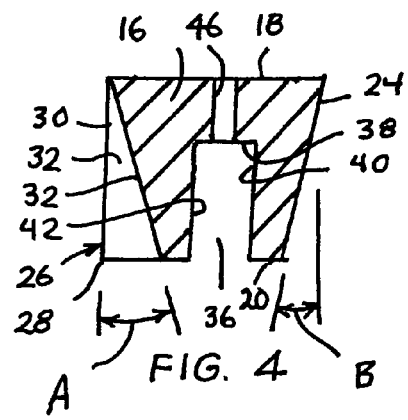
FIG. 4 is a section view taken along line 4-4 of FIG. 3 illustrating detail of a ground engaging traction wedge according to the present invention.

Referring now to the drawings and to FIG. 1 in particular, a horseshoe 10, according to this invention, is shown secured to the bottom surface 12 of the hoof 14 of a horse. The horseshoe 10 is of U-shaped configuration, generally matches the contour or shape of the hoof 14, and encircles the frog of the hoof.

Figure 2:
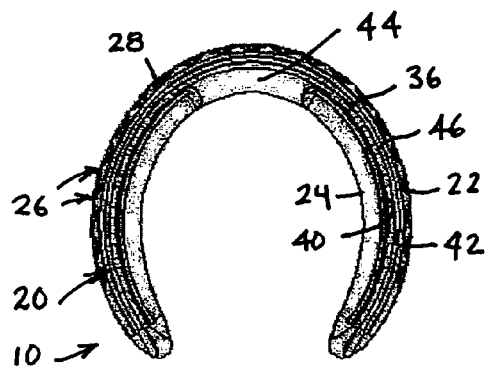
FIG. 2 is a plan view of the ground engaging surface of the horseshoe shown in FIG. 1.

Referring to FIG. 2, as viewed from the earth side, the horseshoe 10 comprises a body 16 having a U-shaped configuration, the body including an upper hoof engaging surface or section 18, a lower ground engaging surface or section 20, and a convex outer and a concave inner side wall 22 and 24. The sidewalls 22 and 24 extend between the surfaces 18 and 20 and each sidewall is at an acute angle relative to a perpendicular drawn to the hoof engaging surface 18.

Preferably, the convex sidewall 22 is at an acute angle "A" of about from between 15° and 22° to a perpendicular extending from the hoof engaging surface 18, and the concave sidewall 24 is at an acute angle "B" of about from between 8° and 15° to a perpendicular extending from the hoof engaging surface 18.

Preferably and critical to this invention, the horseshoe 10 is provided with an arrangement for improving traction of the horseshoe As shown in FIGS. 1-4, the arrangement includes a continuous sequence of separate, side-by-side triangular shaped projections or wedge members 26, which are integrally formed and extend outwardly from and around the convex outer side wall 22. The wedge members 26 are preferably in the form of like shape equilateral triangles with the base and apex of the triangles, respectively, being proximate to the hoof and ground engaging surfaces 18 and 20.

The wedge members 26 extend downwardly from the hoof engaging surface 18 and outwardly from the convex sidewall 22 and terminate in a V-shaped end 28 to engage the ground. Each wedge 26 includes a triangular shaped surface 30 and a pair of triangular shaped sides 32 and 34, which terminate at and cooperate to form the V-shaped ground engaging end 28 at the ground engaging surface 20.

The triangular shaped surfaces 30 are in a plane that is generally perpendicular to the hoof engaging surface 18 and at the acute angle "A" to the convex outer sidewall 22. Although shown as equilateral triangles, the sidewalls 30 and 32 may have an acute angle "C" of about 55° to 65°. Further, the triangles may be scalene triangles (i.e., no sides of equal length), but with the apexes being at the junction of the sidewall 22 and ground engaging surface 20, wherein to provide a series of angled or jagged earth engaging wedges.

According to an important aspect of this invention, the horseshoe 10 comprises an open sided U-shaped crease or swedge 36 in the ground engaging surface 20 of the body 16. The swedge 36 is defined in part by a well that is formed by a substantially planar topside portion of the surface 20, a planar swedge surface 38, and inner and outer sidewalls 40 and 42, each of the sidewalls 40 and 42 being substantially perpendicular to the topside 20 at portions proximal thereto.

The ground and hoof sections 18 and 20 and the sidewalls 22 and 24 jointly define an arcuate toe section 44 and the open sided swedge 36 extends completely through the ground section 18. A wear member, such as a toe calk (not shown) is adapted to be received in the swedge portion of the arcuate toe section to increase traction.

A series of bores 46 extend through the body 16 and communicate with the swedge 36, the bores 46 being adapted to receive nails to attach the horseshoe 10 to the hoof 14.

While many materials and methods for manufacturing the horseshoe are known in the art, preferably, the horseshoe is of a steel alloy, aluminum, aluminum alloy, or plastic, and extruded.

Although various embodiments of the invention have been disclosed for illustrative purposes, it is understood that variations and modifications can be made by one skilled in the art without departing from the spirit of the invention.

What is claimed is:

1. A horseshoe adapted to be attached to the hoof of a horse, comprising a one-piece body having a U-shaped configuration, said body including a ground engaging surface, a hoof engaging surface, and outer and inner side walls extending between said surfaces, said side walls being at an acute angle to the hoof engaging surface and converging towards one another from the hoof engaging surface to the ground engaging surface, and means for improving traction of the horseshoe, said means being integrally formed with and extending transversely outwardly from and around the outer side wall.

2. The horseshoe of claim 1 wherein said means for improving traction comprises a continuous sequence of separate three-dimensional pyramidal shaped projections, the the projections being disposed between the surfaces and each having a V-shaped apex that is proximate to the ground engaging surface.

3. The horseshoe of claim 1 wherein said means for improving traction comprises a plurality of V-shaped wedges which are angularly spaced and in side-by-side relation about the outer side wall, each wedge extending downwardly from the hoof engaging surface and terminating in a V-shaped ground engaging edge adjacent to the ground engaging surface, the V-shaped ground engaging edge being transverse to the outer side wall.

4. The horseshoe of claim 3, wherein each wedge includes a triangular shaped surface, the triangular shaped surfaces are disposed in a U-shaped plane that is generally perpendicular to and extends downwardly from the outer periphery of the hoof engaging surface and the outer sidewall is at an acute angle to the U-shaped plane.

5. The horseshoe of claim 4, wherein the outer sidewall is at an acute angle of about from between 15° and 22° to a perpendicular extending from the ground engaging surface and the V-shaped end of the wedge has an acute angle of about 55° to 65°.

6. The horseshoe of claim 1, further comprising an open sided swedge in the ground engaging surface of the body.

7. The horseshoe of claim 6 wherein the swedge is disposed between said outer and inner side walls, said swedge comprising a channel that is U-shaped in cross-section, vertically disposed and substantially perpendicular to the ground engaging surface, and opens on the ground engaging surface.

8. The horseshoe of claim 1, wherein the body is comprised of a material selected from the group consisting of steel, aluminum, and plastic.

9. The horseshoe of claim 8 wherein the horseshoe is comprised of an extruded aluminum alloy.

10. A horseshoe adapted to be fitted to the hoof of a horse, comprising:
   a U-shaped one-piece body having opposite ends and defined by inner and outer sidewalls and upper hoof and lower ground engaging sections extending between the sidewalls, said sidewalls being at an acute angle to the hoof engaging section and converging towards one another, and said ground and hoof engaging sections and said sidewalls jointly defining an arcuate toe section,
   a succession of raised three-dimensional V-shaped wedge members extending between the sections, said wedge members being angularly disposed in side-by-side relation around and extending transversely outwardly from said outer sidewall, each said wedge formed by a pair of raised sides and a V-shaped surface which conjoin to form a V-shaped ground engaging edge that is proximate to the intersection between the ground engaging section and projects transversely outwardly from the outer sidewall, and the V-shaped surfaces of said wedge members projecting downwardly at a right angle to the upper hoof engaging section, and a continuous downwardly open swedge formed in the lower ground engaging section, said swedge being adapted to receive a wear member, generally U-shaped in cross-section, and extending between the opposite ends of said ground engaging section.

11. The horseshoe as recited in claim 10, wherein the V-shaped surfaces form equilateral shaped triangles having a base and a V-shaped apex distal thereto, the bases of the triangles being proximate to the intersection between the outer sidewall and the hoof engaging section and the V-shaped apexes of the triangles being proximate to the intersection between the outer sidewall and the ground engaging section and forming ground engaging edges of the wedges.

12. The horseshoe as recited in claim 10, wherein the wedge members are configured as triangular shaped pyramids and the apexes of the pyramids are generally uniformly spaced about the outer sidewall and terminate proximate to the lower ground engaging section.

* * * * *